US012566521B2

(12) United States Patent
Park et al.

(10) Patent No.: US 12,566,521 B2
(45) Date of Patent: Mar. 3, 2026

(54) TOUCH PANEL AND DISPLAY DEVICE WITH ELECTROSTATIC DISCHARGE PROTECTION PATTERN

(71) Applicant: G2TOUCH Co., LTD., Seongnam-si (KR)

(72) Inventors: Jae Hwan Park, Seongnam-si (KR); Hong Geun Ji, Seongnam-si (KR)

(73) Assignee: G2TOUCH Co., Ltd., Seongnam-si (KR)

( * ) Notice: Subject to any disclaimer, the term of this patent is extended or adjusted under 35 U.S.C. 154(b) by 0 days.

(21) Appl. No.: 18/960,838

(22) Filed: Nov. 26, 2024

(65) Prior Publication Data

US 2025/0216981 A1　　Jul. 3, 2025

(30) Foreign Application Priority Data

Jan. 3, 2024　　(KR) ......................... 10-2024-0000723

(51) Int. Cl.
*G06F 3/041* (2006.01)
*G06F 3/044* (2006.01)

(52) U.S. Cl.
CPC .......... *G06F 3/0418* (2013.01); *G06F 3/0446* (2019.05)

(58) Field of Classification Search
CPC ................. G06F 3/0418; G06F 3/0446; G06F 2203/04107
See application file for complete search history.

(56) References Cited

U.S. PATENT DOCUMENTS

| | | | | |
|---|---|---|---|---|
| 6,483,931 B2 * | 11/2002 | Kalnitsky | .......... | G06V 40/1329 |
| | | | | 324/661 |
| 6,987,871 B2 * | 1/2006 | Kalnitsky | .............. | H10D 89/60 |
| | | | | 324/688 |
| 7,522,753 B2 * | 4/2009 | Kalnitsky | .......... | G06V 40/1329 |
| | | | | 382/125 |
| 7,768,273 B1 * | 8/2010 | Kalnitsky | .............. | H10D 89/60 |
| | | | | 324/661 |
| 2001/0012384 A1 * | 8/2001 | Kalnitsky | .......... | G06V 40/1329 |
| | | | | 382/124 |
| 2003/0035572 A1 * | 2/2003 | Kalnitsky | .............. | H10D 89/60 |
| | | | | 382/124 |
| 2006/0011997 A1 * | 1/2006 | Kalnitsky | .......... | G06V 40/1329 |
| | | | | 257/414 |

(Continued)

FOREIGN PATENT DOCUMENTS

| | | | | |
|---|---|---|---|---|
| CN | 110346994 A | 10/2019 | | |
| CN | 114020165 A | * 2/2022 | ............. | G06F 3/041 |

(Continued)

*Primary Examiner* — Michael Pervan

(57) ABSTRACT

The present invention relates to a display device and, more particularly, to a touch panel having an improved electrostatic discharge (ESD) protection pattern for effective protection against electrostatic discharge. According to an embodiment of the invention, the touch panel having the electrostatic discharge (ESD) protection pattern includes: a plurality of sensing electrodes arranged in a matrix of multiple rows and multiple columns; a touch integrated circuit (IC) applying a sensing voltage to the sensing electrodes to detect the presence of a touch on the sensing electrodes; and a plurality of ground (GND) signal lines arranged in a predetermined pattern within the touch panel to protect the touch panel against electrostatic discharge.

8 Claims, 5 Drawing Sheets

(56) References Cited

U.S. PATENT DOCUMENTS

| | | | | |
|---|---|---|---|---|
| 2015/0022741 | A1* | 1/2015 | Nii | .......................... H05K 1/189 |
| | | | | 349/12 |
| 2024/0264694 | A1* | 8/2024 | Fang | ..................... G06F 3/0443 |

FOREIGN PATENT DOCUMENTS

| | | | | |
|---|---|---|---|---|
| KR | 10-2019-0052744 A | | 5/2019 | |
| KR | 10-2023-0016403 A | | 2/2023 | |
| WO | WO-2023070733 A1 | * | 5/2023 | ............. G06F 3/041 |

* cited by examiner

TOUCH PANEL AND DISPLAY DEVICE WITH ELECTROSTATIC DISCHARGE PROTECTION PATTERN

CROSS-REFERENCE TO RELATED APPLICATION

The present application claims priority to and the benefit of Korean Patent Application No. 10-2024-0000723, filed on Jan. 3, 2024, in the Korean Intellectual Property Office, the entire disclosure of which is incorporated herein by reference.

TECHNICAL FIELD

The present invention relates to a display device and, more particularly, to a touch panel having an improved electrostatic discharge (ESD) protection pattern for effective protection against electrostatic discharge, and a display device including the same.

BACKGROUND ART

Electrostatic discharge (ESD) is a sudden flow of electric current between two electrically charged objects due to contact, electrical shorting, or dielectric breakdown. This phenomenon arises when a static charge accumulates on an object or a person and then suddenly moves to another object with an opposite charge.

Especially, electrostatic discharge (ESD) is a common occurrence in the electronics manufacturing and handling industries that can lead to damage to electronic components. Integrated circuits, semiconductors, and other sensitive electronic components are susceptible to damage caused by ESD.

In industries that handle sensitive electronic components, a variety of measures are implemented to prevent damage caused by electrostatic discharge.

Some common strategies include:

Use of anti-static materials: Employing anti-static materials for workbenches, floors, and protective clothing to reduce generation of static electricity;

ESD-safe workbench: Employing a work area designed with proper grounding, an anti-static work surface, and anti-static tools;

Personal grounding: Wearing grounded wrist straps or foot straps providing a path for static electricity to dissipate;

Humidity control: Maintaining appropriate humidity levels to reduce the risk of accumulation of static electricity; and Packaging: Employing anti-static packaging materials for transportation and storage of sensitive electronic components.

Failure to properly manage ESD risks can result in latent defects in electronic components, causing reduction in reliability and lifespan thereof.

Therefore, proper ESD prevention measures are essential in environments where electronic devices are manufactured, assembled, repaired, or handled.

FIG. 1 is a schematic diagram of a typical touch panel having ground (GND) signal lines.

Referring to FIG. 1, a typical touch panel includes ground (GND) signal lines 140 only at lateral sides thereof.

In the structure of FIG. 1, upon application of a sensing voltage to sensing electrodes 110, signal interference occurs between adjacent sensing electrodes 110. Moreover, to reduce such signal interference, it may be necessary to apply a separate ground voltage to the sensing electrodes 110.

PRIOR ART REFERENCE

Patent Document (Patent Document 1) Korean Patent Laid-open Publication No. 10-2015-0128558 (Nov. 18, 2015)

DISCLOSURE

Technical Problem

The present invention has been conceived to address the aforementioned problems of typical touch panels and provides a touch panel having an improved electrostatic discharge (ESD) protection pattern for effective protection against electrostatic discharge, and a display device including the same.

The technical problems to be solved by the present invention are not limited to those mentioned above, and other technical problems not mentioned will be apparent to a person having ordinary skill in the art to which the present invention pertains from the detailed description of the invention.

Technical Solution

In accordance with one embodiment of the present invention, a touch panel having an electrostatic discharge (ESD) protection pattern includes:

a plurality of sensing electrodes arranged in a matrix of multiple rows and multiple columns;

a touch integrated circuit (IC) applying a sensing voltage to the sensing electrodes to detect a touch on the sensing electrodes; and a plurality of ground (GND) signal lines arranged in a predetermined pattern within the touch panel to protect the touch panel against electrostatic discharge.

Preferably, the touch panel further includes:

a plurality of sensing signal lines each connected to a corresponding one of the sensing electrodes to transmit a sensing signal from the sensing electrodes to the touch IC, wherein some of the ground (GND) signal lines are disposed parallel to the sensing signal lines.

Preferably, the ground (GND) signal lines include:

a first ground (GND) signal line led out from a ground terminal of the touch IC and disposed at a first lateral end of the touch panel;

a plurality of second ground (GND) signal lines each disposed between adjacent columns of an array of the sensing electrodes; and a third ground (GND) signal line led out from the ground terminal of the touch IC and disposed at a second lateral end of the touch panel opposite the first lateral end.

Preferably, some second ground (GND) signal lines are connected to the first ground (GND) signal line, and the other second ground (GND) signal lines are connected to the third ground (GND) signal line.

Preferably, the touch panel further includes:

a fan-out area in which the plurality of sensing signal lines is multiplexed and input to the touch IC; and at least one fourth ground (GND) signal line led out from the ground terminal of the touch IC and disposed within the fan-out area, wherein a free end of the second ground (GND) signal line not connected to the first ground (GND) signal line or the third ground (GND) signal line extends to the fan-out area.

Preferably, the touch panel further includes:

at least one fourth ground (GND) signal line connected to the second ground (GND) signal line and disposed perpendicular to the sensing signal lines, wherein the fourth ground (GND) signal line is disposed between adjacent rows of the array of the sensing electrodes.

Preferably, the touch panel further includes:

a fan-out area in which the plurality of sensing signal lines is multiplexed and input to the touch IC; and at least one fifth ground (GND) signal line connected to the fourth ground (GND) signal line and disposed within the fan-out area, wherein a free end of the second ground (GND) signal line not connected to the first ground (GND) signal line or the third ground (GND) signal line extends to the fan-out area.

In accordance with another embodiment of the present invention, a display device includes a touch panel having a predetermined electrostatic discharge (ESD) protection pattern.

Effects of the Invention

The touch panel having the electrostatic discharge protection pattern and the display device including the same can provide effective protection against electrostatic discharge.

The effects of the present invention are not limited to those mentioned above, and other effects not mentioned will be apparent to those skilled in the art from the detailed description of the invention.

DETAILED DESCRIPTION

Figure 1:
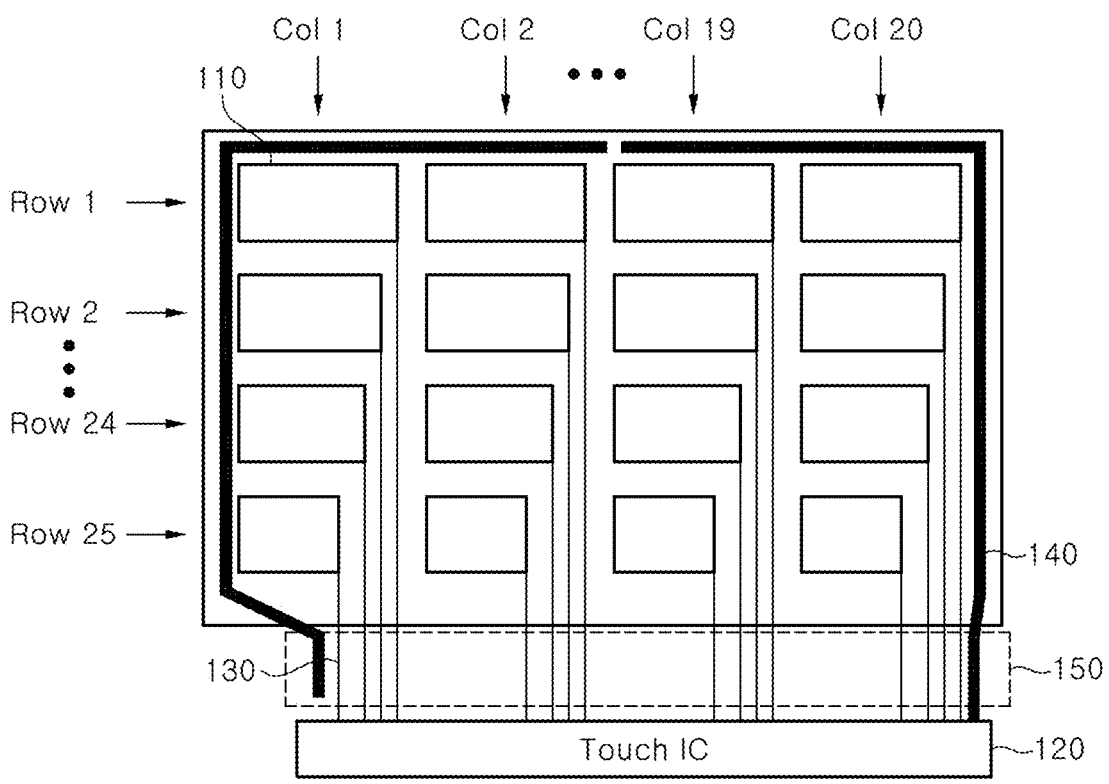
FIG. 1 is a schematic diagram of a typical touch panel having a ground (GND) signal line.

For full understanding of the present invention, operational advantages thereof, and the purposes accomplished by practice thereof, reference is made to the accompanying drawings, which illustrate preferred embodiments of the invention, and to the description thereof.

Hereinafter, the present invention will be described in detail with reference to preferred embodiments of the present invention illustrated in the accompanying drawings. It should be noted that like elements will be denoted by like reference numerals throughout the specification and the accompanying drawings.

Hereinafter, preferred embodiments of the present invention will be described in detail with reference to the accompanying drawings.

As used herein, the term "touch panel" refers to a capacitive touch panel, which is a device that generates a predetermined capacitance between a touch pattern thereof and a human finger or a touch input tool having similar conductive characteristics thereto to detect the presence of a touch based on a change in voltage across the generated capacitance.

Figure 2:
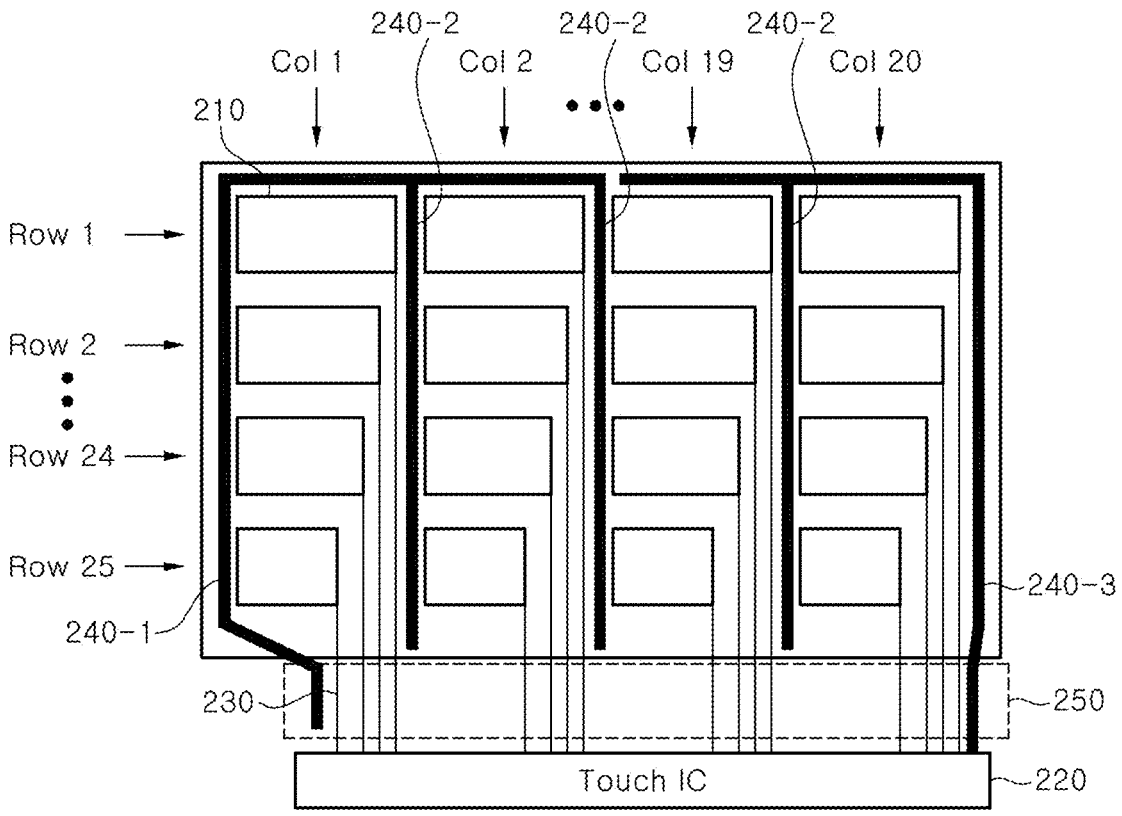
FIG. 2 is a schematic diagram of a touch panel having an improved electrostatic discharge protection pattern according to a first embodiment of the present invention.

FIG. 2 is a schematic diagram of a touch panel having an improved electrostatic discharge protection pattern according to a first embodiment of the present invention.

In accordance with one embodiment of the present invention, a touch panel having an electrostatic discharge (ESD) protection pattern includes: a plurality of sensing electrodes 210 arranged in a matrix of multiple rows and multiple columns; a touch integrated circuit (IC) 220 applying a sensing voltage to the sensing electrodes 210 to detect the presence of a touch on the sensing electrodes 210; and a plurality of ground (GND) signal lines 240-1, 240-2, 240-3 arranged in a predetermined pattern within the touch panel to protect the touch panel against electrostatic discharge.

In one embodiment, the touch panel having the electrostatic discharge (ESD) protection pattern according to the present invention further includes a plurality of sensing signal lines 230 each connected to a corresponding one of the plurality of sensing electrodes 210 to transmit a sensing signal from the sensing electrodes 210 to the touch IC 220.

In one embodiment, some of the ground (GND) signal lines are disposed parallel to the sensing signal lines 230.

In another embodiment, some of the ground (GND) signal lines are disposed perpendicular to the sensing signal lines 230.

Referring to the embodiment illustrated in FIG. 2, the ground (GND) signal lines include: a first ground (GND) signal line 240-1 led out from a ground terminal of the touch IC 220 and disposed at a first lateral end of the touch panel; a plurality of second ground (GND) signal lines 240-2 each disposed between adjacent columns of the array of the sensing electrodes 210, and a third ground (GND) signal line 240-3 led out from the ground terminal of the touch IC 220 and disposed at a second lateral end of the touch panel opposite the first lateral end.

The number of second ground (GND) signal lines 240-2 may be varied depending on the size of the touch panel and the number of sensing electrodes.

In one embodiment, some second ground (GND) signal lines 240-2 are connected to the first ground (GND) signal line 240-1, and the other second ground (GND) signal lines 240-2 are connected to the third ground (GND) signal line 240-3.

In another embodiment, each of the second ground (GND) signal lines 240-2 may be individually led out from the ground terminal of the touch IC 220 and disposed between adjacent columns of the array of the sensing electrodes 210 without being connected to the first ground (GND) signal line 240-1 or the third ground (GND) signal line 240-3.

Since a separate second ground (GND) signal line 240-2 is disposed between adjacent columns of the array of the sensing electrodes, it is possible to prevent electrostatic discharge from reaching the sensing electrodes 210 and the sensing signal lines 230. Furthermore, any electrostatic discharge introduced into the touch panel can be rapidly dissipated through the second ground (GND) signal lines 240-2.

5
6

Figure 3:
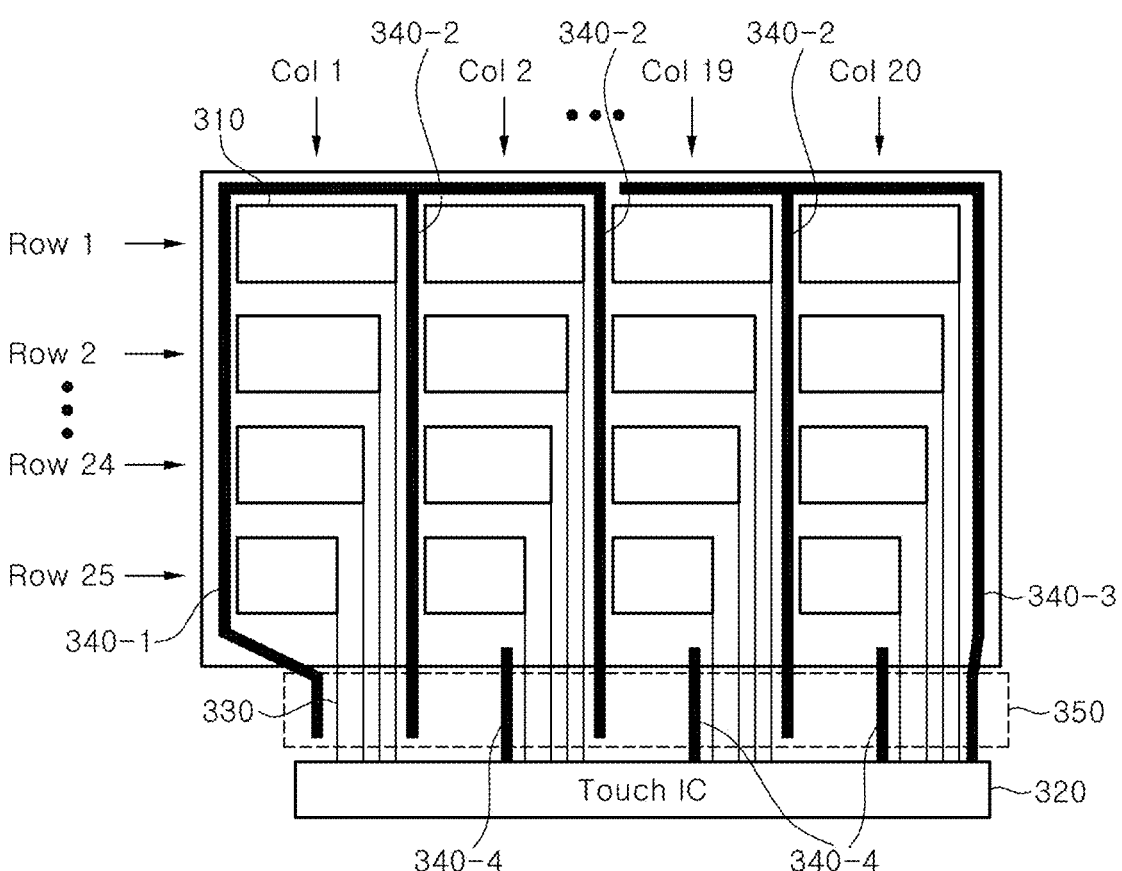
FIG. 3 is a schematic diagram of a touch panel having an improved electrostatic discharge protection pattern according to a second embodiment of the present invention.

FIG. 3 is a schematic diagram of a touch panel having an improved electrostatic discharge protection pattern according to a second embodiment of the present invention.

The embodiment illustrated in FIG. 3 is substantially the same as the embodiment of FIG. 2 except that a free end of a second ground (GND) signal line 340-2 extends to a fan-out area of the touch panel, and that the touch panel further includes a separate fourth ground (GND) signal line 340-4 in the fan-out area.

In one embodiment, the touch panel having the improved electrostatic discharge protection pattern according to the present invention further includes: a fan-out area 350 in which a plurality of sensing signal lines 330 is multiplexed and input to a touch IC 320; and at least one fourth ground (GND) signal line 340-4 led out from a ground terminal of the touch IC 320 and disposed in the fan-out area 350.

In one embodiment, a free end of the second ground (GND) signal line 340-2, which is not connected to the first ground (GND) signal line 340-1 or the third ground (GND) signal line 340-3, extends to the fan-out area 350.

In one embodiment, the fourth ground (GND) signal line 340-4 is disposed between adjacent second ground (GND) signal lines 340-2 to be parallel thereto.

Figure 4:
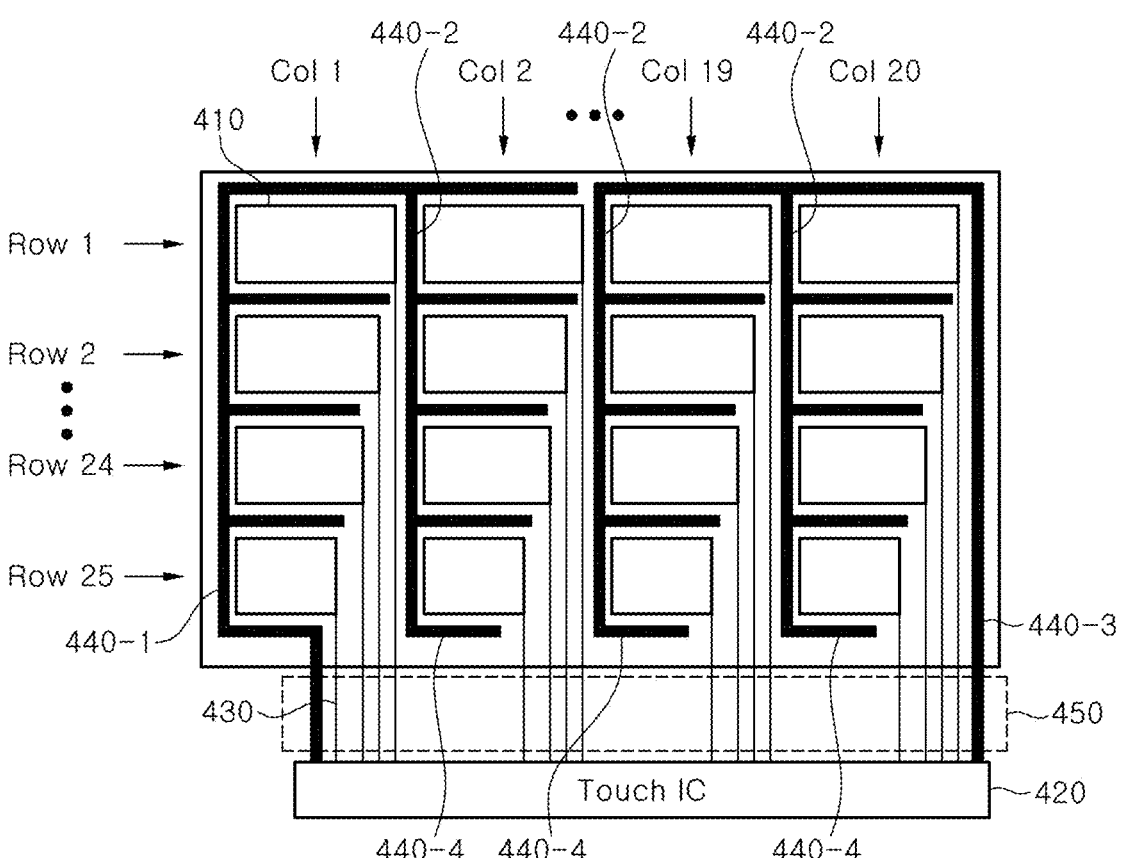
FIG. 4 is a schematic diagram of a touch panel having an improved electrostatic discharge protection pattern according to a third embodiment of the present invention.

FIG. 4 is a schematic diagram of a touch panel having an improved electrostatic discharge protection pattern according to a third embodiment of the present invention.

The embodiment illustrated in FIG. 4 is substantially the same as the embodiment of FIG. 2 except that the touch panel further includes a fourth ground (GND) signal line 440-4.

In one embodiment, the touch panel having the improved electrostatic discharge prevention according to the present invention further includes at least one fourth ground (GND) signal line 440-4 connected to a second ground (GND) signal line 440-2 and disposed perpendicular to a sensing signal line 430.

In one embodiment, the fourth ground (GND) signal line 440-4 is disposed between adjacent rows of the array of sensing electrodes 410.

In the embodiment illustrated in FIG. 4, since ground (GND) signal lines 440-1, 440-2, 440-3, 440-4 are disposed at both lateral sides and upper/lower sides of the sensing electrode 410, it is possible to effectively prevent electrostatic discharge (ESD) from reaching the sensing signal line 430 of the touch panel.

Figure 5:
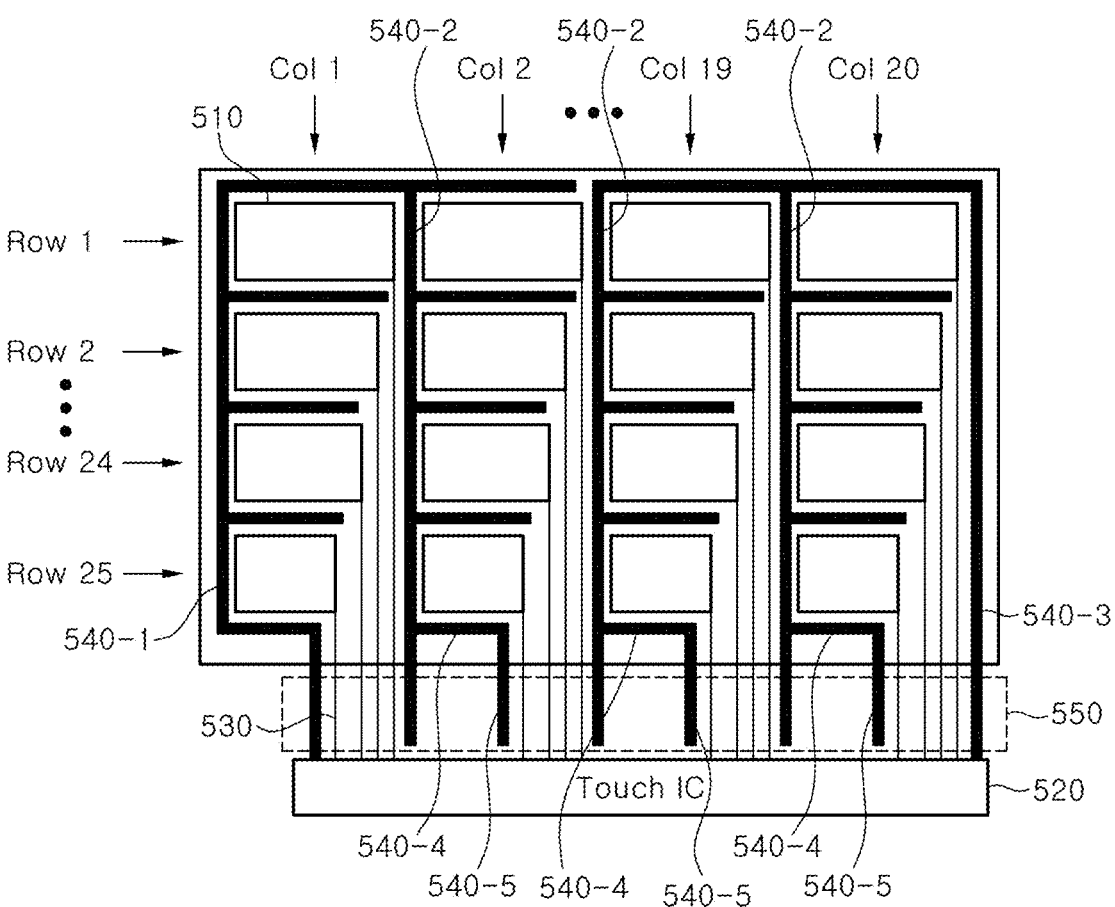
FIG. 5 is a schematic diagram of a touch panel having an improved electrostatic discharge protection pattern according to a fourth embodiment of the present invention.

FIG. 5 is a schematic diagram of a touch panel having an improved electrostatic discharge protection pattern according to a fourth embodiment of the present invention.

The embodiment illustrated in FIG. 5 is substantially the same as the embodiment of FIG. 4 except that the touch panel further includes a fifth ground (GND) signal line 540-5 disposed in a fan-out area 550.

In one embodiment, the touch panel having the improved electrostatic discharge protection pattern according to the present invention further includes: a fan-out area 550 in which a plurality of sensing signal lines 530 is multiplexed and input to a touch IC 520; and at least one fifth ground (GND) signal line 540-5 connected to a fourth ground (GND) signal line 540-4 and disposed in the fan-out area 550.

In one embodiment, a free end of a second ground (GND) signal line 540-2, which is not connected to a first ground (GND) signal line 540-1 or a third ground (GND) signal line 540-3, extends to the fan-out area 550.

Since a separate fifth ground (GND) signal line 540-5 is disposed in the fan-out area 550, it is possible to effectively protect the fan-out area 550 against electrostatic discharge (ESD).

Although some embodiments have been described herein, it should be understood by a person having ordinary knowledge in the art that the present invention is not limited to the above embodiments and the accompanying drawings and that various modifications, variations and alterations can be made without departing from the spirit and scope of the invention.

The invention claimed is:

1. A touch panel having an electrostatic discharge (ESD) protection pattern, comprising:

a plurality of sensing electrodes arranged in a matrix of multiple rows and multiple columns;

a touch integrated circuit (IC) applying a sensing voltage to the sensing electrodes to detect the presence of a touch on the sensing electrodes;

a plurality of sensing signal lines each connected to a corresponding one of the sensing electrodes to transmit a sensing signal from the sensing electrodes to the touch IC;

a plurality of ground (GND) signal lines arranged in a predetermined pattern within the touch panel to protect the touch panel against electrostatic discharge; and a fan-out area in which the plurality of sensing signal lines is multiplexed and input to the touch IC;

wherein the plurality of ground (GND) signal lines comprise:

a first ground (GND) signal line led out from a ground terminal of the touch IC and disposed at a first lateral end of the touch panel;

a plurality of second ground (GND) signal lines each disposed between adjacent columns of an array of the sensing electrodes;

a third ground (GND) signal line led out from the ground terminal of the touch IC and disposed at a second lateral end of the touch panel opposite the first lateral end;

at least one fourth ground (GND) signal line connected to the second ground (GND) signal line and disposed perpendicular to the sensing signal lines or led out from the ground terminal of the touch IC and disposed within the fan-out area; and at least one fifth ground (GND) signal line connected to the fourth ground (GND) signal line and disposed within the fan-out area.

2. The touch panel according to claim 1, wherein some of the ground (GND) signal lines are disposed parallel to the sensing signal lines.

3. The touch panel according to claim 1, wherein some second ground (GND) signal lines are connected to the first ground (GND) signal line, and the other second ground (GND) signal lines are connected to the third ground (GND) signal line.

4. The touch panel according to claim 3, wherein a free end of the second ground (GND) signal line not connected to the first ground (GND) signal line or the third ground (GND) signal line extends to the fan-out area.

5. The touch panel according to claim 3, wherein the fourth ground (GND) signal line is disposed between adjacent rows of the array of the sensing electrodes.

6. The touch panel according to claim 5, wherein a free end of the second ground (GND) signal line not connected to the first ground (GND) signal line or the third ground (GND) signal line extends to the fan-out area.

7. A display device comprising the touch panel having the electrostatic discharge (ESD) protection pattern according to claim 1.

8. A touch panel having an electrostatic discharge (ESD) protection pattern, comprising:

a plurality of sensing electrodes arranged in a matrix of multiple rows and multiple columns;

a touch integrated circuit (IC) applying a sensing voltage to the sensing electrodes to detect the presence of a touch on the sensing electrodes;

a plurality of sensing signal lines each connected to a corresponding one of the sensing electrodes to transmit a sensing signal from the sensing electrodes to the touch IC;

a fan-out area in which the plurality of sensing signal lines is multiplexed and input to the touch IC; and a plurality of ground (GND) signal lines arranged in a predetermined pattern within the touch panel to protect the touch panel against electrostatic discharge,

wherein some of the ground (GND) signal lines are disposed parallel to the sensing signal lines, wherein the ground (GND) signal lines comprise:

a first ground (GND) signal line led out from a ground terminal of the touch IC and disposed at a first lateral end of the touch panel;

a plurality of second ground (GND) signal lines each disposed between adjacent columns of an array of the sensing electrodes;

a third ground (GND) signal line led out from the ground terminal of the touch IC and disposed at a second lateral end of the touch panel opposite the first lateral end; and at least one fourth ground (GND) signal line led out from the ground terminal of the touch IC and disposed within the fan-out area, wherein some second ground (GND) signal lines are connected to the first ground (GND) signal line, and the other second ground (GND) signal lines are connected to the third ground (GND) signal line, and wherein a free end of the second ground (GND) signal line not connected to the first ground (GND) signal line or the third ground (GND) signal line extends to the fan-out area.

* * * * *